United States Patent [19]

Peterson

[11] Patent Number: 5,370,844
[45] Date of Patent: Dec. 6, 1994

[54] FCC DISENGAGEMENT APPARATUS

[75] Inventor: Robert B. Peterson, Houston, Tex.

[73] Assignee: The M. W. Kellogg Company, Houston, Tex.

[21] Appl. No.: 24,692

[22] Filed: Mar. 1, 1993

[51] Int. Cl.⁵ ............................................. F27B 15/00
[52] U.S. Cl. ................................. 422/147; 422/141; 208/153; 208/157
[58] Field of Search .............. 422/147, 141; 55/459.1, 55/345; 208/153, 157

[56] References Cited

U.S. PATENT DOCUMENTS

| | | | |
|---|---|---|---|
| 2,337,684 | 12/1943 | Scheineman | 422/147 X |
| 3,724,176 | 4/1973 | Vishnevsky et al. | 55/269 |
| 4,909,993 | 3/1990 | Haddad et al. | 422/144 |
| 5,221,301 | 6/1993 | Giuricich | 422/147 X |

Primary Examiner—Timothy M. McMahon
Attorney, Agent, or Firm—John P. Ward

[57] ABSTRACT

A separator apparatus and method for a hydrocarbon fluidized catalytic cracking process are disclosed. The apparatus comprises a main plenum in a disengagement vessel which connects a plurality of riser cyclones in a riser catalyst separation stage to a plurality of secondary cyclones in a secondary catalyst separation stage. The cyclones in the second and each succeeding stage receive a substantially equal amount of gas from the plenum. The effluent gas is substantially prevented from leaking into the interior space of the disengagement vessel. Also disclosed is a method for retrofitting an existing plant with the plenum design to provide a more compact arrangement of the catalyst separation equipment in the disengagement vessel.

12 Claims, 2 Drawing Sheets

FCC DISENGAGEMENT APPARATUS

FIELD OF THE INVENTION

The present invention relates to an apparatus for catalyst disengagement in fluidized catalytic cracking (FCC).

BACKGROUND OF THE INVENTION

Advances in the catalyst arts have greatly improved efficiencies of catalysts used in the fluidized catalytic cracking of hydrocarbons. As a result, much attention has been devoted to the separation of such catalysts from the effluent gas. Recent developments known as "closed" cyclone technology are disclosed in U.S. Pat. No. 4,909,993, to Haddad et al. which is hereby incorporated herein by reference. Briefly, the output of a reactor riser zone is fed to a primary cyclone separator which is connected in series by a conduit to a second cyclone separator. The conduit is said to prevent random post-riser thermal cracking of the hydrocarbons after they exit the primary cyclone separator by passing the gas directly to the second cyclone without additional residence time in the reaction vessel. The conduit contains an annular port to introduce a stripping gas to improve hydrocarbon/catalyst separation. As described in the Haddad reference, gas leaving the secondary cyclone separator can be passed directly to a tertiary cyclone separator by a pipe connection before leaving the reaction vessel in an exit port. Fourth, fifth, etc. stages can be used in series.

Catalyst separated in the primary cyclone drops through a dipleg attached thereto and passes through a dipleg seal to substantially prevent gas flow through the dipleg. The separated catalyst from each subsequent cyclone separator stage in the series moves down similar cyclone diplegs and accumulates in a bed at the bottom of the reaction vessel. In the bed, stripping steam is used to remove residual hydrocarbons. The stripped catalyst can be removed for conventional reuse or regeneration.

Since most existing hydrocarbon cracking plants were designed using the less efficient catalysts of the past, use of improved catalysts frequently requires retrofitting of an existing catalyst removal system with a design such as that disclosed in the Haddad reference. However, because of limited space in the disengagement vessel and the existing cyclone placement, it is not always possible to achieve efficient catalyst recovery in the retrofit. Often, the existing secondary cyclones must be replaced with expensive, resized newer cyclones.

SUMMARY OF THE INVENTION

A catalyst disengagement apparatus has been designed for a high efficiency hydrocarbon fluidized catalytic cracking process which advantageously permits a plurality of cyclone separators to be used for each catalyst separation stage. As one aspect, a more compact cyclone arrangement can be employed in a retrofit plant or a smaller disengager vessel can be used in a new plant. As another aspect, the number of riser cyclone separators and secondary cyclone separators in each stage can be dissimilar for enhanced flexibility. As a further aspect, a secondary cyclone can be installed with respect to a riser cyclone wherein their respective diameters overlap relative to a central axis.

In one embodiment, the present invention provides an improved catalyst disengagement apparatus in a hydrocarbon fluidized catalytic cracking process. The apparatus includes a disengagement vessel having disposed therein a riser cyclone separator in a riser catalyst separation stage ducted to receive effluent gas from a riser conversion zone, and a secondary cyclone separator in a secondary catalyst separation stage ducted to receive discharge gas from the riser cyclone separator. The improvement comprises a main plenum connecting a plurality of riser cyclones to a plurality of secondary cyclones which includes a manifold section for gathering the gas discharged from the riser cyclones into the plenum and a distribution section for distributing the gas to respective inlets of the secondary cyclones. The plenum substantially inhibits gas leakage into the disengagement vessel. Thus, the riser cyclones can receive a substantially equal portion of gas from the riser and the secondary cyclones can receive a substantially equal portion of gas from the riser cyclones. In a preferred embodiment, the duct from each riser cyclone has one or more vents for introducing a stripping gas therein. The number of riser cyclones can be different, preferably less than the number of secondary cyclones. The riser and secondary cyclones are preferably radially spaced with respect to a central axis of the disengagement vessel. The radius of a circle inscribing outermost walls of the riser cyclones can be greater than the radius of a circle inscribing innermost walls of the secondary cyclones. The radius of a circle inscribing the innermost walls of the secondary cyclones can be less than the radius of a circle inscribing the centerline of a riser cyclone.

As an additional embodiment, the present invention provides a method for disengaging catalyst particles from a cracked hydrocarbon gas in a fluidized catalytic cracking process. As a first step, the cracked hydrocarbon gas containing suspended catalyst particles is passed through a riser to a plurality of riser cyclones. A portion of the suspended catalyst is separated from the cracked hydrocarbons in the riser cyclones. The riser cyclone discharge gas is introduced to a plurality of secondary cyclones through a main plenum including a manifold section for gathering the riser cyclone discharge gas and a distribution section for distributing the riser cyclone discharge gas. An additional portion of the suspended catalyst is separated from the riser cyclone discharge gas in the secondary cyclones.

As a further embodiment, the present invention provides a method for retrofitting an existing hydrocarbon fluidized catalytic cracking plant, wherein the plant includes riser cyclones in a riser catalyst separation stage and secondary cyclones in a secondary catalyst separation stage. The method includes connecting the riser cyclones to the secondary cyclones through a main plenum. The plenum includes a manifold section for gathering gas discharged from the riser cyclones and a distribution section for distributing the gas to the inlets of secondary cyclones. The plenum generally inhibits leakage of the discharge gas into the disengagement vessel.

DETAILED DESCRIPTION OF THE INVENTION

Figure 1:
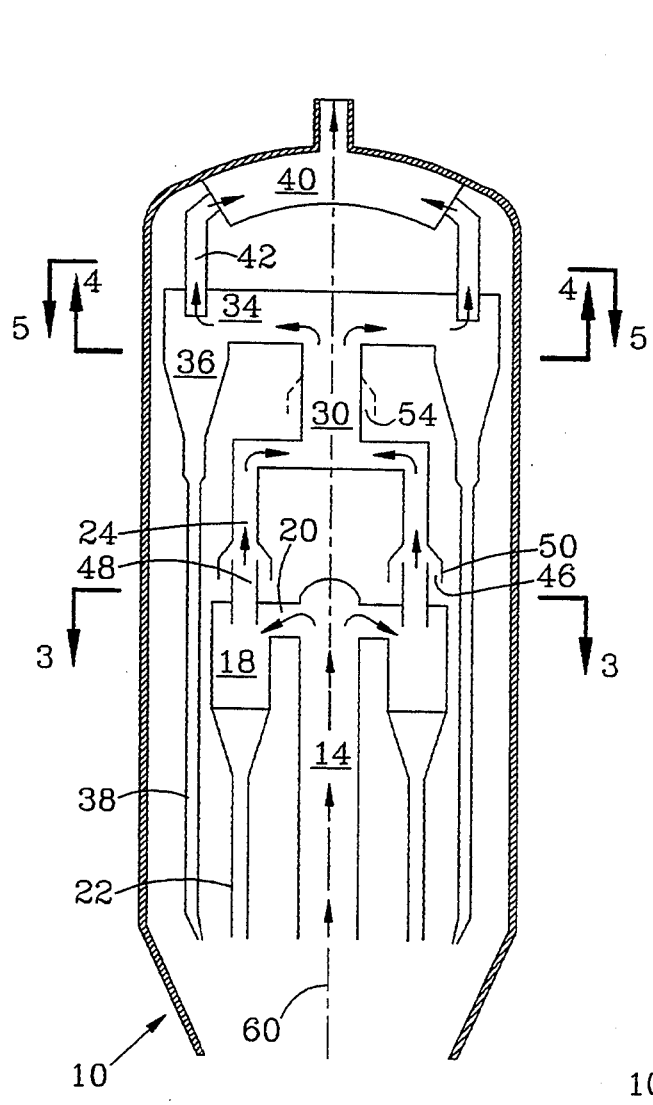
FIG. 1 is a schematic view in axial cross-sectional of a disengagement apparatus of one embodiment of the present invention with an upflow riser orientation also showing radial overlap in the placement of the riser and secondary cyclones relative to the axis of the disengagement vessel.

Fluid catalytic cracking (FCC) of hydrocarbons for example, into lighter products such as gasoline, is well known. This process employs finely divided catalyst particles which are fluidized by the gaseous hydrocarbons. The fluidized catalyst is circulated continuously between a reaction zone and a hot regeneration zone. The catalyst is heated in the regeneration zone and then released to the reaction zone.

Referring to FIGS. 1-5, in which like numerals reference like parts, the reaction zone terminates in a riser leg 14 which rises in a disengagement vessel 10. The riser 14 is in fluid communication with a riser separation stage comprising a plurality of riser cyclone separators 18. The separators 18 are radially spaced from the riser 14, and receive a roughly evenly distributed proportion of the riser discharge through ducts 20 connected individually to each respective separator 18. In the riser separation stage, a major portion of the suspended catalyst is conventionally separated from the riser effluent gas and removed by gravity down a dipleg 22 to a catalyst accumulation zone (not shown).

Discharge gas from the riser separation stage passes through riser cyclone discharge ducts 24 and is gathered into a plenum 30. The gas is then distributed through ducts 34 to a secondary separation stage. The secondary separation stage includes a plurality of generally radially spaced secondary cyclone separators 36. The ducts 34 roughly evenly distribute the gas from the plenum 30 to the secondary cyclones 36 wherein substantially all of the remaining suspended catalyst particles are separated and removed by gravity down a dipleg 38 to the catalyst accumulation zone. Discharge gas from the secondary separation stage is gathered into an outlet header 40 through ducts 42 for removal from the disengagement vessel 10.

If desired, discharge gas from the secondary separation stage can be similarly gathered and distributed using a second plenum (not shown) for roughly evenly distributing the gas to a tertiary or auxiliary catalyst separation stage (not shown) before discharge from the vessel 10.

Typically, a stripping gas such as steam is used to enhance catalyst separation between the cyclone separation stages. Vents 46 are provided in each duct 24 to permit introduction of the stripping gas. The vents 46 are preferably annular and formed by splitting the duct 24 with the end of a first section 48 disposed in an enlarged diameter end 50 of a second section. Alternatively, a single vent 54 can be made in the plenum 30 in a fashion similar to the vents 46 just described. The stripping gas is typically introduced into the catalyst accumulation zone (not shown), and rises up through the disengagement vessel 10 to enter the vents 46 and/or 54. Conventional means known in the art can be used to substantially prevent discharge gas from escaping through the diplegs 22, 38.

Figure 3:
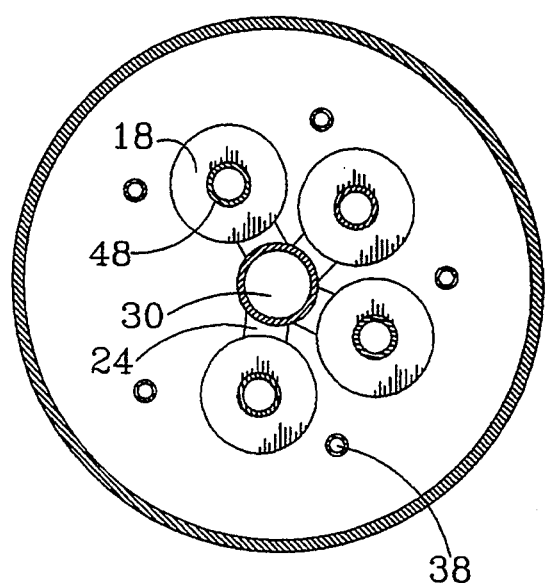
FIG. 3 is a plan view of another embodiment of the invention showing four riser cyclone separators spaced radially in the disengagement apparatus and fed by a riser located outside the disengagement vessel.
Figure 4:
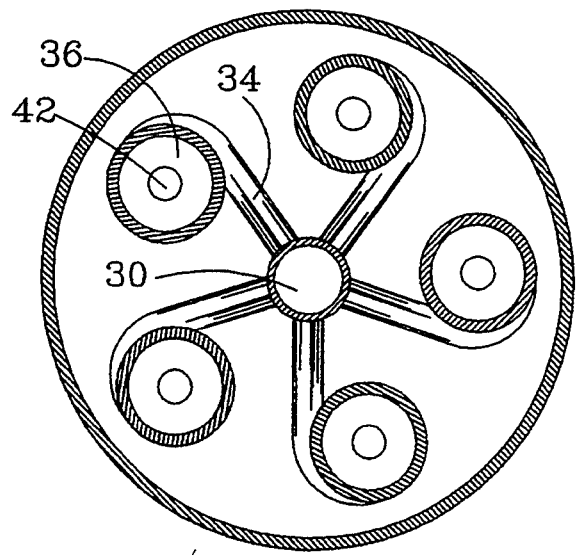
FIG. 4 is a plan view of the embodiment of FIG. 3 showing five secondary cyclones spaced radially in the disengagement apparatus.
Figure 5:
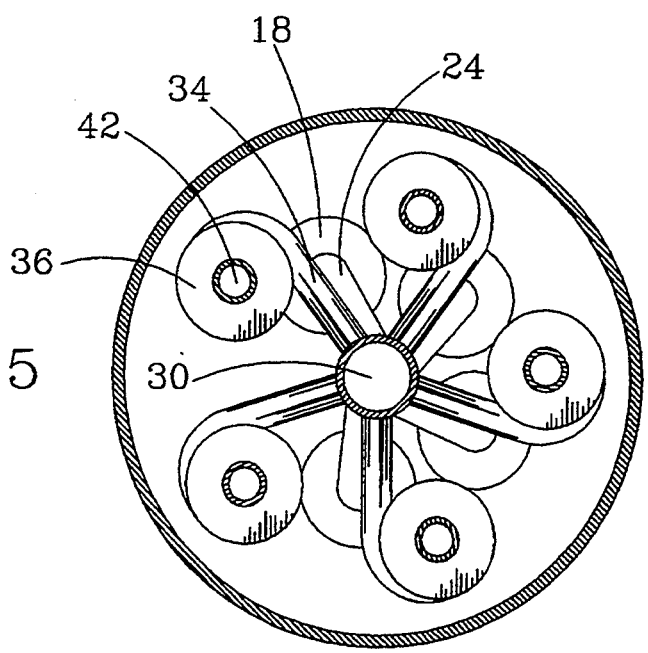
FIG. 5 is a plan view of the embodiment of FIGS. 3 and 4 showing radial overlap in the placement of the riser and secondary cyclones.

The number of cyclones used in each stage will depend on process variables including flowrate, desired separation efficiency, available space in the disengagement vessel, and the like. The number of separators per stage can be from 1 to 10 or more, but preferably is from 2 to 8 and more preferably from 2 to 6. It can be seen that such an arrangement allows for enhanced design flexibility when retrofitting or designing different plants. In addition, the number of cyclone separators in the riser stage can be the same or different from the number in the secondary stage or tertiary stage (if used). FIGS. 3 and 4 show an exemplary arrangement wherein the riser separation stage includes four cyclone separators and the secondary separation stage includes five cyclone separators.

Another advantage of the present invention is that the secondary cyclones 36 can be installed with respect to the riser cyclones 18 wherein their respective diameters overlap radially relative to the central axis 60 of the disengagement vessel 10 for additional compactness. This can best be seen in FIGS. 1-2 wherein a radial distance from the axis 60 to the outermost dimension of the riser cyclones 18 is greater that a radial distance from the axis 60 to the innermost dimension of the secondary cyclones 36. Preferably, the secondary cyclones 36 are positioned so the respective diplegs 38 can depend vertically, radially spaced outwardly from the outermost dimension of the cyclones 18, or disposed offset so the diplegs 38 are disposed in the cusps between the riser cyclones 18. Similarly illustrated in FIGS. 3-4, the radius of a circle inscribing the outermost wall of the riser cyclones 18 is greater than the radius of a circle inscribing the innermost wall of the secondary cyclones 36. Also, the lateral dimension of the secondary cyclones 36 can overlap the centerline of the riser cyclones 18. These configurations were not generally possible in prior art designs which had a single duct rising vertically from the riser cyclone to feed a secondary cyclone in series.

Figure 2:
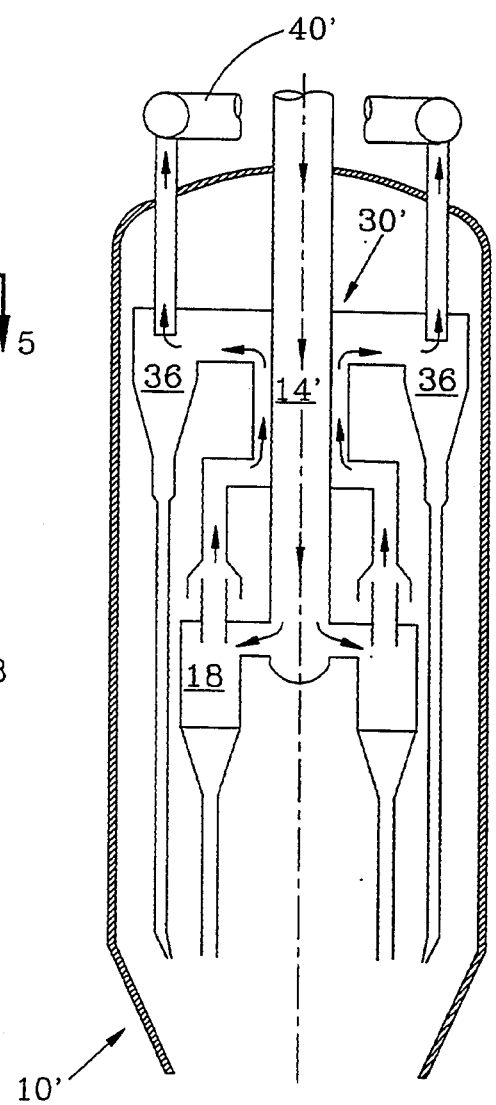
FIG. 2 is a schematic view in axial cross-sectional of a disengagement apparatus of an alternate embodiment of the present invention with a downflow riser orientation also showing radial overlap in the placement of the riser and secondary cyclones relative to the axis of the disengagement vessel.

While installation adjacent an upflowing riser 14 as shown in FIG. 1 is common, other installation schemes can be used. As shown in FIG. 2, cracked hydrocarbon effluent passes through a downflowing riser 14' to the riser cyclones 18 in the riser catalyst separation stage. Gas from the riser cyclones 18 is gathered into and distributed by an annular plenum 30' to the secondary cyclones 36. Gas from the secondary cyclones 36 exiting the disengagement vessel 10' is gathered in an outlet header 40'.

The riser cyclones 18 are installed generally radially from the axis 60 of the disengagement vessel 10 and ducted to receive a substantially equal distribution of the effluent gas from the riser leg 14. The plenum 30 is installed generally at the axis 60 between the riser cyclones 18 and the secondary cyclones 36, and ducted so that the discharge gas from the riser cyclones 18 is gathered and substantially equally distributed to the secondary cyclones 36. The secondary cyclones 36 are installed generally radially from the plenum 30. The plenum 30, riser cyclones 18 and secondary cyclones 36 are ducted to substantially inhibit leakage of the discharge gas into the interior space of the disengagement vessel 10. Any desired tertiary cyclones (not shown) are installed, similarly to the secondary cyclones 36, to receive gas from the secondary cyclones through an auxiliary plenum manifolded between the secondary cyclones and the tertiary cyclones.

In the practice of the present invention, cracked hydrocarbons containing a fluidized catalyst leave the reactor and enter a riser 14 for discharge through two or more catalyst separation stages. Catalyst particles must be promptly removed from the effluent gas to prevent undesirable reactions with the cracked hydrocarbons. In the riser separation stage, riser cyclone separators receiving substantially equal portions of the effluent gas separate a major portion of the suspended catalyst from the hydrocarbons. Secondary cyclones receiving substantially equal portions of the gas discharged from the riser separation stage separate another portion of the suspended catalyst from the hydrocarbons. The system of plenum 30, riser cyclones 18 and secondary cyclones 36 is preferably "closed" between separators and the riser 14 to substantially inhibit leakage of the riser discharge gas into the interior region of the disengagement vessel 10. However, vents are preferably provided in the plenum 30 to facilitate introducing the stripper gas into the riser discharge gas.

The present catalyst disengagement apparatus and method are illustrated by way of the foregoing description and examples. The foregoing description is intended as a non-limiting illustration, since many variations will become apparent to those skilled in the art in view thereof. It is intended that all such variations within the scope and spirit of the appended claims be embraced thereby.

What is claimed is:

1. In an apparatus for the fluidized catalytic cracking of a hydrocarbon stream comprising a riser and a catalyst disengagement vessel having disposed therein a plurality of riser cyclone separators in a riser catalyst separation stage, each of the riser cyclone separators individually ducted to the riser to receive effluent gas from the riser and a plurality of secondary cyclone separators in a secondary catalyst separation stage, each of the secondary cyclone separators in the secondary catalyst separation stage individually ducted to receive discharge gas from the riser catalyst separation stage, the improvement comprising:

a main plenum, connecting the plurality of riser cyclone separators to the plurality of secondary cyclone separators, including a manifold section for gathering gas discharged from each of the riser cyclone separators into the plenum and a distribution section for distributing the gas to respective inlets of each of the secondary cyclone separators;

wherein the plenum substantially inhibits leakage of the effluent and discharge gases into the disengagement vessel.

2. The improvement of claim 1, wherein the manifold section includes a duct from each riser cyclone separator having one or more vents for introducing a stripping gas therein.

3. The improvement of claim 1 wherein the riser and secondary cyclone separators are radially spaced in the disengagement vessel.

4. The improvement of claim 1, wherein the radius of a circle inscribing an outermost wall of the riser cyclone separators is greater than the radius of a circle inscribing an innermost wall of the secondary cyclones.

5. The improvement of claim 1, wherein the radius of a circle inscribing an innermost wall of the secondary cyclone separators is less than the radius of a circle inscribing the centerlines of the riser cyclone separators.

6. The improvement of claim 1, wherein the number of riser cyclone separators is different from the number of secondary cyclones.

7. The improvement of claim 6, wherein the number of riser cyclone separators is less than the number of secondary cyclones.

8. A method for disengaging catalyst particles from a cracked hydrocarbon gas in a fluidized cracking catalytic process, comprising the steps of:

passing cracked hydrocarbon gas containing suspended catalyst particles through a riser to a plurality of riser cyclone separators in a riser catalyst separation stage;

separating a portion of the suspended catalyst from the cracked hydrocarbon gas in the riser cyclone separators;

discharging gas from each of the riser cyclone separators to a plurality of secondary cyclone separators in a secondary catalyst separation stage through a main plenum having a manifold section for gathering the discharge gas from each of the riser cyclone separators and a distribution section for distributing the discharge gas to each of the secondary cyclone separators in the secondary catalyst separation stage, wherein the leakage of hydrocarbons into the disengagement vessel is substantially inhibited; and separating an additional portion of the suspended catalyst in the secondary cyclone separators from the cracked hydrocarbon gas.

9. The method of claim 8, including the step of introducing a stripping gas into the riser discharge gas through a vent(s) formed in the manifold section.

10. The method of claim 8, further comprising the step of gathering gas discharged from the secondary cyclone separators in an outlet header.

11. A method for retrofitting a hydrocarbon fluidized catalytic cracking apparatus comprising a riser and a catalyst disengagement vessel having disposed therein a plurality of riser cyclone separators in a riser catalyst separation stage and a plurality of secondary cyclone separators in a secondary catalyst separation stage, comprising the step of:

connecting the riser cyclone separators in the riser catalyst separation stage to the secondary cyclone separators in the secondary catalyst separation stage through a main plenum comprising a manifold section for receiving gas discharged from the riser cyclone separators and a distribution section for distributing gas to the secondary cyclone separators, wherein the gas is substantially prevented from passing into the disengagement vessel.

12. The method of claim 11, wherein the manifold section includes a vent(s) for introducing a stripping gas.

* * * * *